US009661275B2

(12) United States Patent
Gordon et al.

(10) Patent No.: US 9,661,275 B2
(45) Date of Patent: May 23, 2017

(54) DYNAMIC MULTI-PERSPECTIVE INTERACTIVE EVENT VISUALIZATION SYSTEM AND METHOD

(76) Inventors: Scott Gordon, Bellingham, WA (US); Daniel Gordon, Spanaway, WA (US); Sean Simmons, Bellingham, WA (US)

( * ) Notice: Subject to any disclaimer, the term of this patent is extended or adjusted under 35 U.S.C. 154(b) by 785 days.

(21) Appl. No.: 12/484,871

(22) Filed: Jun. 15, 2009

(65) Prior Publication Data

US 2009/0309975 A1 Dec. 17, 2009

Related U.S. Application Data (60) Provisional application No. 61/061,242, filed on Jun. 13, 2008.

(51) Int. Cl.
| | |
|---|---|
| *H04N 7/00* | (2011.01) |
| *H04N 7/173* | (2011.01) |
| *H04N 5/232* | (2006.01) |
| *H04N 21/21* | (2011.01) |
| *H04N 21/23* | (2011.01) |
| *H04N 21/2343* | (2011.01) |
| *H04N 21/472* | (2011.01) |
| *H04N 21/485* | (2011.01) |

(52) U.S. Cl.
CPC ..... *H04N 7/17318* (2013.01); *H04N 5/23206* (2013.01); *H04N 21/21* (2013.01); *H04N 21/23* (2013.01); *H04N 21/23439* (2013.01); *H04N 21/47202* (2013.01); *H04N 21/4852* (2013.01); *H04N 21/4854* (2013.01)

(58) Field of Classification Search
CPC ............ H04N 7/17318; H04N 5/23206
USPC .......................................... 348/159
See application file for complete search history.

(56) References Cited

U.S. PATENT DOCUMENTS

| | | | | |
|---|---|---|---|---|
| 5,187,571 A | * | 2/1993 | Braun et al. | 348/39 |
| 5,280,305 A | * | 1/1994 | Monroe et al. | 347/129 |
| 5,708,469 A | * | 1/1998 | Herzberg | H04N 7/181 348/37 |
| 5,801,685 A | * | 9/1998 | Miller et al. | 715/202 |
| 5,956,081 A | * | 9/1999 | Katz | H04N 7/181 348/159 |
| 6,351,324 B1 | * | 2/2002 | Flint | 359/202.1 |
| 6,529,949 B1 | * | 3/2003 | Getsin et al. | 709/217 |
| 6,992,702 B1 | * | 1/2006 | Foote et al. | 348/211.8 |
| 2002/0141499 A1 | * | 10/2002 | Goertzen | 375/240.12 |
| 2003/0184651 A1 | * | 10/2003 | Ohsawa | H04N 1/00307 348/207.1 |
| 2005/0059487 A1 | * | 3/2005 | Wilder | G02B 27/2214 463/32 |
| 2006/0230427 A1 | * | 10/2006 | Kunkel et al. | 725/133 |
| 2009/0296929 A1 | * | 12/2009 | Wachtfogel et al. | 380/213 |

* cited by examiner

Primary Examiner — Jeffery Williams
(74) Attorney, Agent, or Firm — Howard & Howard Attorneys PLLC (57) ABSTRACT

An event visualization system. The system uses a digital video capture array. The array is synchronized into a composited video feed file. The composited video feed file has a number of unit perspective video files. Each unit perspective video file has a coordinate location, a unit frame height, and a unit frame width. The unit perspective video files can be played simultaneously for individual display in a digital event player. The digital event player is operated on a client.

7 Claims, 9 Drawing Sheets

DYNAMIC MULTI-PERSPECTIVE INTERACTIVE EVENT VISUALIZATION SYSTEM AND METHOD

RELATED APPLICATIONS

This application claims priority benefit of U.S. Ser. No. 61/061,242 filed Jun. 13, 2008 with a twelve month priority filing date falling on a Saturday, Sunday or Federal Holiday, extending the period of pendency to the next succeeding business day being Jun. 15, 2009.

BACKGROUND

[display/playback] U.S. Pat. No. 7,206,344 discloses a method and apparatus for displaying video; where different presentations of program material are allowed various presentations of a DVD movie, for example, to be displayed on a display for user selection. As seen in the summary of the invention section around line seven "the present invention provides a method and apparatus for displaying AV material having several different possible presentations. The data stream of information for the different AV presentations is received; a first AV presentation is displayed in normal playback mode; an alternative AV presentation is also displayed; and the user is permitted to select a desired AV presentation for display." Furthermore around line 24 column 2, "another embodiment of the invention provides a method and apparatus for receiving a data stream comprised of information for a plurality of presentations of an AV program; displaying a first presentation program in normal playback mode; then, displaying an alternative presentation program in normal playback mode; and permitting user to select a desired presentation program."

Referring to column 5 around line 43 "another embodiment of the invention and flowchart [is shown]. Once again for purses this example, a movie filmed in alternative camera angles will be used as the example to demonstrate various presentations available. Once again a data stream containing a plurality of presentations of an AV program is received, example camera angles for movie. Then a first camera angle is displayed on a portion of the display. The display portion . . . is used to display the first camera angle presentation. Then the first camera angle presentation is converted to a graphics format and displayed on the display portion. At this point the user has the option to select the displayed presentation for full display viewing . . . if another camera angle presentation does exist, and that camera angle presentation is accessed, decoded and displayed in normal playback mode. Predetermined time segment is preferably displayed that is sufficient to allow a highlight of the camera angle presentation."

[display/playback] U.S. Pat. No. 7,196,722 discloses a multiple camera video system which displays selected images, where multiple streams of data stream to a user's terminal with images from different cameras. Low-resolution thumbnail images tell the user what image streams are available. Referring to column two line 3 in the summary of the invention section "the present invention provides a system for capturing multiple images from multiple cameras and selectively presenting desired views to the user. Multiple streams of data are streamed to a user's terminal. One datastream (called a thumbnail stream) is used to tell the user what image streams are available." Referring to column 3 around line 5 "an events is viewed and recorded by four cameras. The event may for example be a baseball game. Images from cameras are captured and edited by the system. System creates two streams of video data. One stream is the images captured by one selected camera. The second stream consists of thumbnails (i.e. small low resolution images) of the images captured by each of the four cameras.

The four cameras as seen in column 3 around line 27, provide images to a unit [a processing unit] which edits the image streams and which creates the thumbnail image stream . . . the data stream from each camera and thumbnail data stream are provided to stream control. The stream control seems to send the stream to viewer software and as seen in line 35, a user can see a display. For an example, the user has an input device, for example a mouse, when user clicks on any one of the thumbnails, viewer software sends a message to control system. Thereafter images from the camera associated with the thumbnail which was clicked are transmitted as the focus strain.

[tracking/rendering] US 2005/0018045 discloses a video processing method for generating a desired view of a real scene from a selected desired viewpoint identifying objects in the real image, determining the positions of the identified objects, and rendering a view of the scene from a selected viewpoint using image data from the real image to render at least some of the identified objects. As seen in the brief summary of the invention section in paragraph 17, "in this way, real image data is used to render selected objects (example players or groups of players in a rugby scrum for example) and the impression given is of a much more realistic view.

[tracking/renderting] U.S. Pat. No. 6,150,123 discloses a method for simultaneous visual tracking of multiple bodies in a closed structured environment, where simultaneous tracking of multiple objects in the sequence of video frames captured by multiple cameras may be accomplished by extracting the foreground element from background in a frame, etc. Referring to column two around line 37 "and embodiment of the present invention is a method of tracking multiple bodies in a structured environment by analyzing a sequence of video frames."

[display] U.S. Pat. No. 6,728,477 discloses a simultaneous multiple angle presentation of DVD audio and visual content where a DVD player or computer with a DVD drive seen simultaneously presents multiple angles of video on a display. Referring to the summary the invention section in column 2 around line 19 "the user selects parameters for viewing any number of angles from the available angles up to nine. Video frames for the selected angles are scaled down in size, after being decoded, to fit into a section or fragment of the display screen, and scaled frames are assembled into a single frame for presentation on the display screen." As seen in column four around line 48, "the display shows another example of simultaneous multiple angle presentation of DVD content. In this example, five angles are shown having different sizes. The user can select any number of angles for viewing, up to the total made available by the author of the DVD content, and can choose the size and arrangement for each selected angle in the available space, or display fragment, on the screen display.

U.S. Pat. No. 6,431,944 discloses a golf swing and ball flight recording system, where the system allows golfers to visualize their swing from various angles, and the flight of the ball after the swing. The system includes a frame having a generally rectangular configuration including top, rear, opposite sides, and open front and an open bottom. Referring to column four around line 18 "a video recorder is provided which is in communication with video cameras for recording images received by cameras. The recorder is preferably secured to the rear of the frame. In a highly preferred embodiment, the recorder has a recording portion corresponding to each of video cameras for recording on tapes positioned in the video recorder."

U.S. Pat. No. 6,415,101 discloses a method and system for scanning and displaying multiple view angles formatted in DVD content, where DVD players are utilized that allow for multiple view angles to be displayed on a common display with one view angle designated as a primary view and the remaining view angles being subordinated to the primary view angle. Referring to column 3 in the summary of the invention section around line 12 "the method provides that the primary view is displayed in a first window while the remaining views are displayed in secondary windows. These windows for secondary views may be inside the primary window or outside the primary window depending upon the choice of viewer."

U.S. Pat. No. 6,333,750 discloses a multi-sourced video distribution hub, where a video graphics system uses a large quantity of video data all independently and selectively made available to a plurality of video display devices. The multi-sourced video distribution element, also referred to as a hub, serves as an interface between one or more sources of video display data in one or more display devices.

U.S. Pat. No. 6,120,432 discloses a method for reproducing data recorded at multiple angles on a recording medium, where the medium is a digital video disc (DVD). Referring to column 2 around line 46, "first in the reproducing a DVD with an apparatus as shown, reproduction mode is set with a preferred angle sequence or a preferred angle by the user using a key panel on the player or the remote control. In this embodiment there are two kinds of reproduction modes: multiple angle mode and a single angle mode. Here the multiple angle mode refers to mode in which the data at an angle is recorded on the disc is reproduced, and then the multiple angle data block is search to be sequentially reproduced."

U.S. Pat. No. 5,850,352 discloses an immersive video, including video hypermosaicing to generate from multiple video views of the scene a three-dimensional video mosaic from which diverse virtual video scene images are synthesized, including panoramic, scene interactive and stereoscopic images. Referring to the summary of the invention section in column nine around line 10, "the present invention contemplates telepresence and immersive video, being the non-real-time creation of a synthesized, virtual, camera/video image of a real-world scene, typically in accordance with one or more human criteria that are chosen by the viewer of the scene . . . when the synthesis and the presentation of the virtual image transpires as the viewer desires—and particularly as the viewer indicates his or her viewing desires simply by action of moving and or orientating any of his or her body, head and eyes—then the process is called immersive telepresence, or simply "telepresence"."

U.S. Pat. No. 5,600,368 discloses an interactive television system and method for viewer control multiple camera viewpoints in broadcast programming, where an interactive television system has a set-top box adapted for use with the TV and remote control handset. As seen in the summary of the invention section around line 5 "television broadcast is filmed using multiple cameras situated at various camera viewpoints, such as at a sporting event where many different cameras are employed to capture the action in several angles." As seen further down in column 2 around line 25 "preferably, a dedicated camera control buttons arranged according to directional components of the compass. In this arrangement, the viewer simply depresses the "north" button when he/she wishes to view the sporting event from the North Side, and so on."

DESCRIPTION OF THE PREFERRED EMBODIMENTS

Generally speaking, what is provided is a dynamic multi-perspective interactive event visualization system and method which enables a video captured event to be displayed in one embodiment as a synchronous composited digital video streamed through a network to a digital event player. The digital event player is configured for navigation purposes to the video captured event for specific playback in a multi-perspective format.

Figure 1:
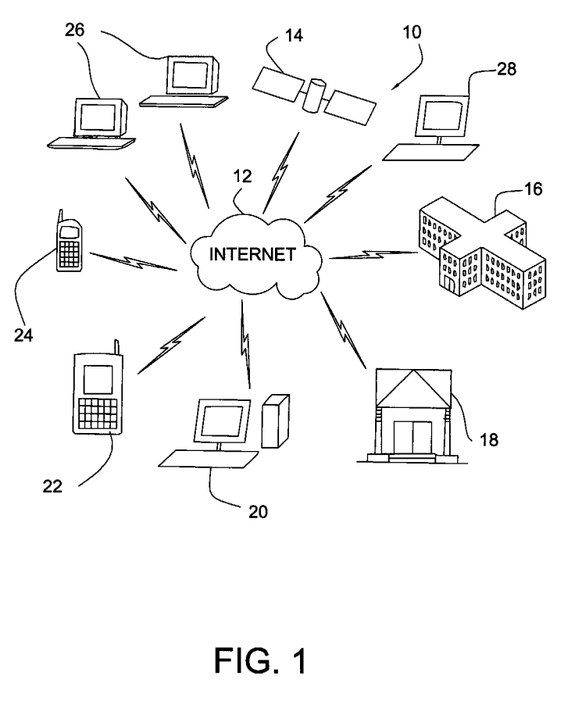
FIG. 1 schematic view of the system.

Referring to FIG. 1, the dynamic multi-perspective interactive event visualization system 10 is provided through an event server 20 and can be implemented over a network/Internet 12. The event server 20 has interactive communication with the Internet 12 and other third-party sites 18 as well as the event location 16, various types of clients such as a desktop client 28, other PC or Mac clients 26, cell phone clients 24, PDA clients 22 as well as plug-ins and thin client applications which may be run on a local client computer 26.

The event itself may be any event which is deserving of broadcast through traditional entertainment means or other nontraditional entertainment means. The present concept is implemented through an Internet application, but may be implemented as well through standard DVD technologies, downloadable MPEG files (such as an Apple iTunes video), television broadcast technologies such as the high definition broadcast technology, cable network technologies, as well as protocol technologies not specifically refered to here in but which are readily available with the art.

What follows is a listing of some events which may be displayed through the dynamic multi-perspective interactive event visualization system. The events may include, a mixed martial arts event (for example as seen in the ultimate fighting championships); a boxing event; other fighting events; basketball; baseball; soccer; football; rugby; tennis; auto racing; hockey; golf; concerts; television productions; plays; movie sets; reality TV shows; Olympic sports; track and field; horse and dog racing; etc.

Figure 2:
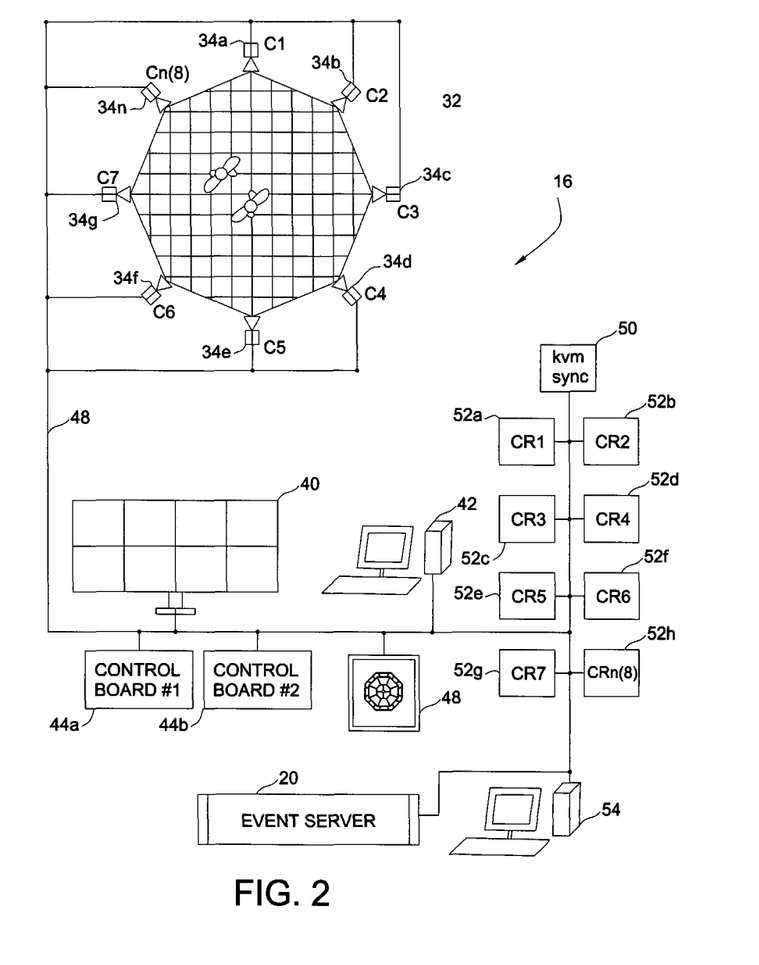
FIG. 2 is a schematic view of the events location with the capture and production components.

Referring to FIG. 2, an example of one event is provided at the event location 16. In this particular embodiment the event location 16 is a mixed martial arts competition which is provided as a UFC or ultimate fighting championship ring which is shown as an octagonal ring configuration. Other configurations can be utilized and will be shown as discussed in further detail below.

Positioned about the octagonal ring 33 are a plurality of direct to drive video capture cameras C1 through Cn or in other words 34a through 34h. Each camera 34 can pan, tilt, swivel and zoom as controlled by a control board 44a and 44b. When synchronized to the video capture rackmount and server 50 and the capture drives 52a through 52h, the cameras form a camera video capture array which may be programmed to pan, tilt, swivel and zoom to a plurality of focal point preset locations about the event.

The focal point presets 38 are mapped to each particular event type as a mapped event 32. As the participants 36 perform in the ring 33, the operator of the control boards 44a through 44b, operate the camera array to track the participants 36 as they move within the mapped event 32. As an alternative to utilizing standard control boards, a focus control panel 48 maybe utilized which plugs into the control boards via USB or other digital connection for customized mapping and tracking of the mapped event 32.

As the video is captured and recorded into the synchronized capture drives 52a through 52h, the operator utilizes a capture control workstation 42 to monitor the real time synchronized video files.

With the event complete, the digital video files are transferred to a postproduction workstation 54 and the files are composited together and encoded as a single video file utilizing various current state-of-the-art postproduction software applications, for example Adobe Premiere, final cut Pro, after effects and the like. While bandwidth may presently be a concern, with available and future compression, broadcast or streaming technologies, the file is envisioned as large as a 4000×4000 pixel video file, or may be scaled down to a next generation blue Ray video file size which is approximately 2000 pixels by 1000 pixels, or even less as the transfer technologies dictate.

Figure 5:
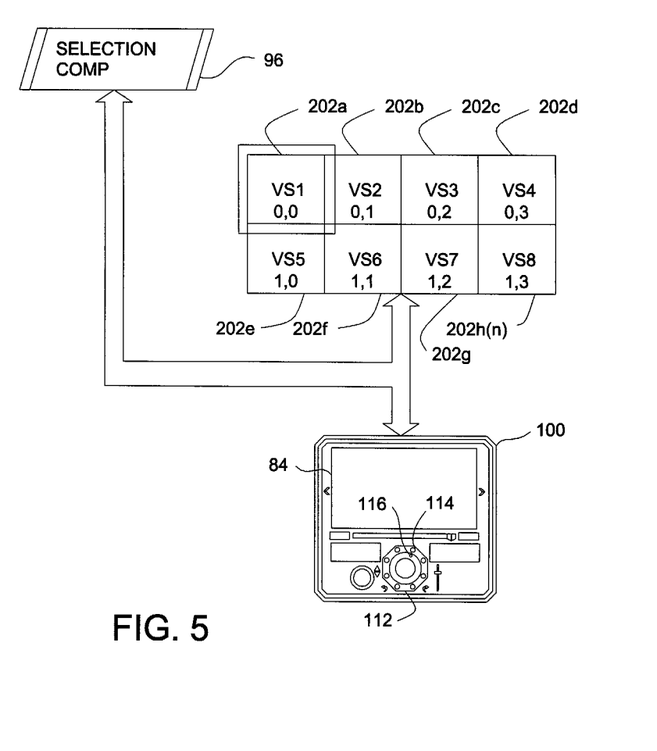
FIG. 5 is a schematic view of the player component operation.

Referring briefly to FIG. 5, each composited video file 200 has unit perspective videos 202a through 202n maintained within the composited video file 200. Each of the individual unit perspective videos 202a-n have a unit frame height 204 and a unit frame width 206. Furthermore, for navigation purposes, each unit perspective video 202a-n has a coordinate location corresponding to its position within the composited video file which may be interpreted as an array. The coordinates enable the player component 100 (discussed below), to be positioned over the properly selected unit perspective video for end player 100 instantaneous display of the selected unit perspective video which provides for presentation of the multi-perspective dynamic interactive video visualization.

Within the player component 100, a player frame 84 is provided and the player frame 84 allows for viewable display of the unit perspective video 202 on a frame by frame basis.

As the user of the player component 100 operates the selector 116 located within the navigation component 112, the view perspective indicator 114 directs the player frame 84 to display the correlated video stream at the coordinate location.

Figure 2A:
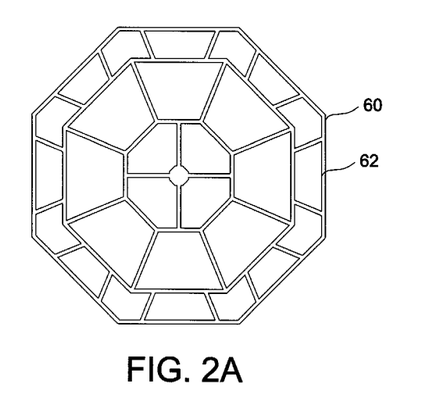
FIGS. 2A through 2F are schematic figures of the navigational controls and focal preset maps.
Figure 4:
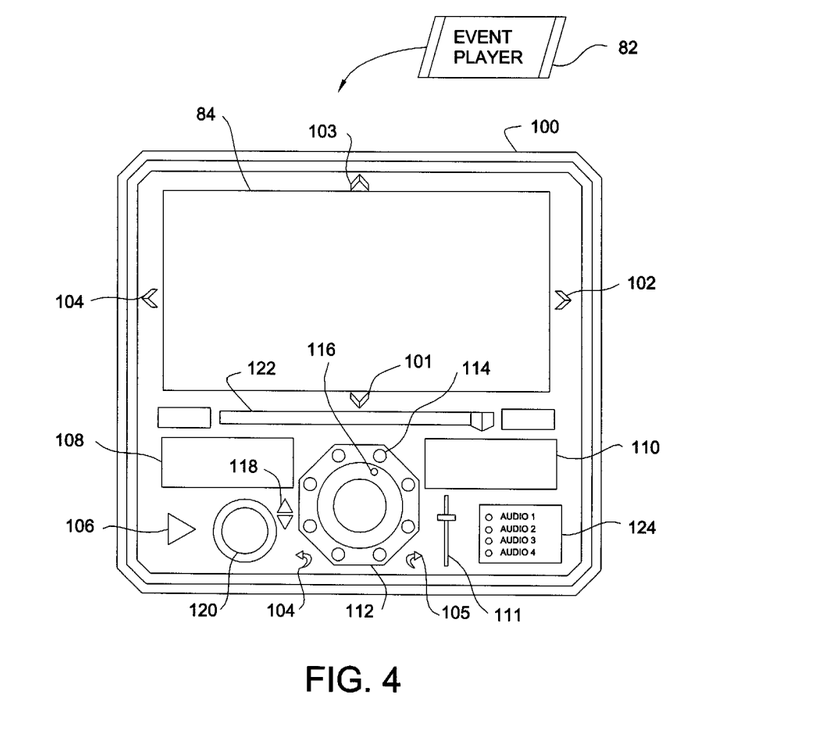
FIG. 4 is a plan view of the player component.

Referring briefly to FIGS. 2a through 2f, the mapped event 32 can be displayed in various focal preset configurations which also correlate to various navigation control components. Referring to FIG. 2a, an octagonal configuration 60 is provided where the octagon may be the ring of a UFC competition, a stadium seating configuration, or other event utilizing a generally octagonal shape. The octagonal configuration 60 can be provided as a shape for the configured navigation component 112 as seen in FIG. 4. Each of the configurations to be discussed, may be interchanged with the configurable navigation component 112 depending upon the particular mapped event 32 as seen in FIG. 2.

Figure 2B:
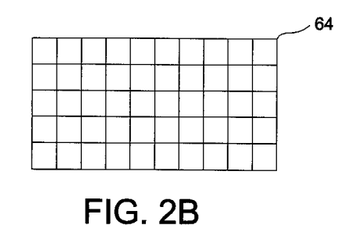

Other configurations may be utilized including a rectangular configuration 64 FIG. 2B which has a plurality of focal preset locations and which may be applied to events such as stages, court sports or outdoor sports including the previously mentioned sporting events as they would fit within a generally rectangular shape.

Figure 2C:
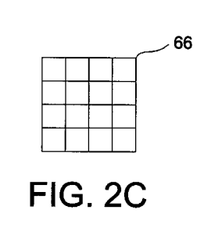
Figure 2D:
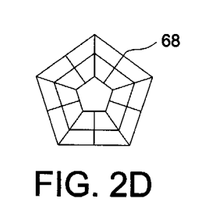
Figure 2E:
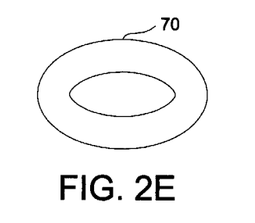

Referring to FIG. 2C, a square configuration 66 is provided for example to represent events such as a stage or a boxing ring or other event which may require just a simple square quadrant configuration. Referring to FIG. 2D, a diamond configuration 68 is provided which may be utilized for example as a baseball configuration or other event which may utilize such a staged configuration. Referring to FIG. 2E, a circular or oval configuration 70 is provided. Such a configuration would enable mapping of a NASCAR event, a track and field event, or other race event such as a horserace or a dog race.

Figure 2F:
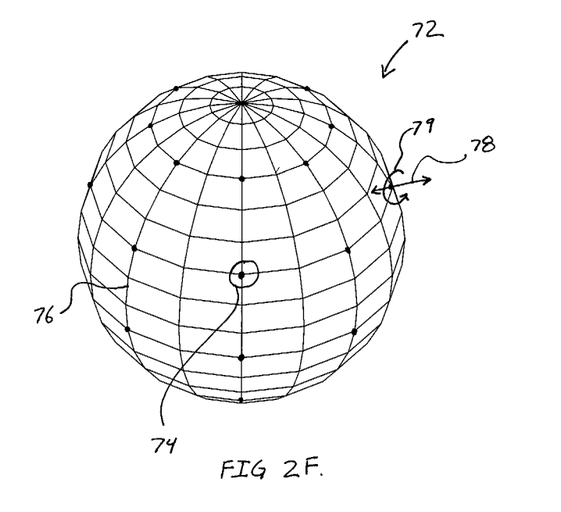

Lastly, referring to FIG. 2F, various three-dimensional configurations 72 can be provided depending on the number of available cameras within the camera array for various three-dimensional capture occasions. In FIG. 2F, a globe configuration is provided where the three-dimensional view perspectives 76 are placed at radialy equidistant locations about the configuration and as plugged into the navigation component 112 the selector 74 is movable by the user to engage the particular the individual unit perspective video frame 202a-n as seen in FIG. 5.

Figure 3:
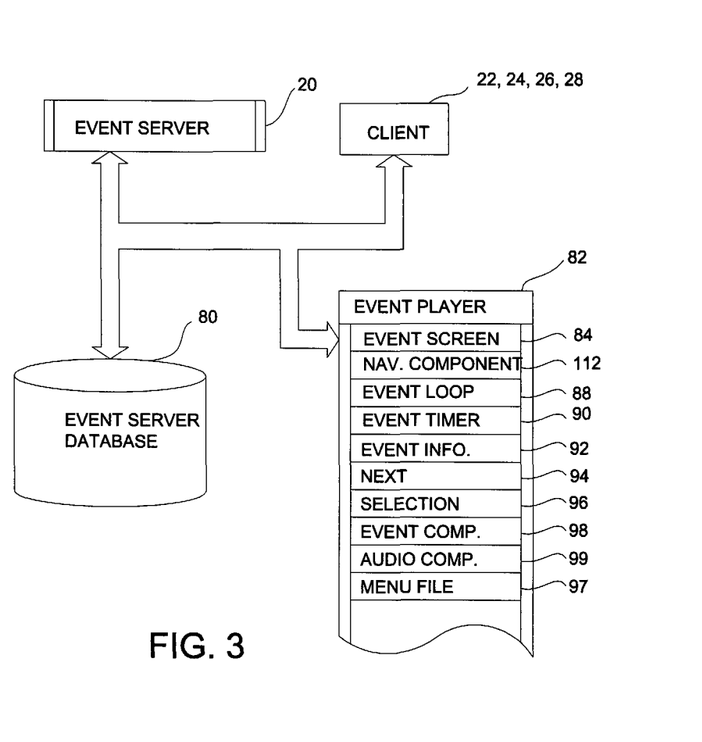
FIG. 3 is a schematic view of the system application architecture.

Referring to FIG. 3, after the postproduction of the composited video file 200 is completed on the workstation 54, it is uploaded to the event server 20. The event server 20 maintains the file 200 in an event server database 80. As individual clients 22, 24, 26, 28, access the site they can initialize or execute an event player 82 which is seen in FIG. 4 as an executed player component 100. The player component may be a configured real-time player or a Java application or other video playback component. The event player 82 has a number of components including an event screen 84, a navigation component 112, an event loop 88, and event timer 90, event information component 92, view scrolling capabilities 94, as well as configurable audio tracks 99 and the events video file 98. The menu file 97 enables the user to choose between various published events for viewing and execute various controls.

Referring to FIG. 4, the player component 100 has a play button 106 which begins the video playback of all the frames simultaneously. A loop control component 120 executes the event loop 88 FIG. 3, and the forward/reverse components 118 when the loop control 120 is engaged, allow for increase and decrease of the loop length depending upon the users desired review of the video file.

The camera angle or chosen unit perspective video frame 202 can be changed by utilizing the scrollbar arrows for next view 102, previous view 104, next vertical view 103, or previous vertical view 101. In addition, the user can operate the selector 116 which in this particular embodiment is configured as a circular knob indicator which enables the user to rotate the selector 116 between the various representations of the view perspectives 114 which are graphical representations of the location of the individual cameras placed about the mapped event 32 as seen in FIG. 2.

When in play mode, the next view arrows 102 and 104 also enable the user to move forward and backward in the video perspective view frames. A time bar 122 is provided to display to the end user the length of the video section. A volume control 111 enables the user to modulate the audio output of the video file. In addition, a plurality of synchronized audio-commentary tracks 124 are provided to the end-user. For example, commentary by the players may be in individual audio files, commentary during the performance itself maybe in another audio file, and a postproduction commentary audio file may be provided. These audio files may be synchronized with the video playback depending on the desired production output. In addition to the above control components, standard stop, forward, pause, rewind, fast-forward and fast reverse control components are also provided.

A discussion of the method for producing the composite video feed file 250 as in FIG. 6, will be discussed along with reference to FIGS. 1, 2, and 4.

Figure 6:
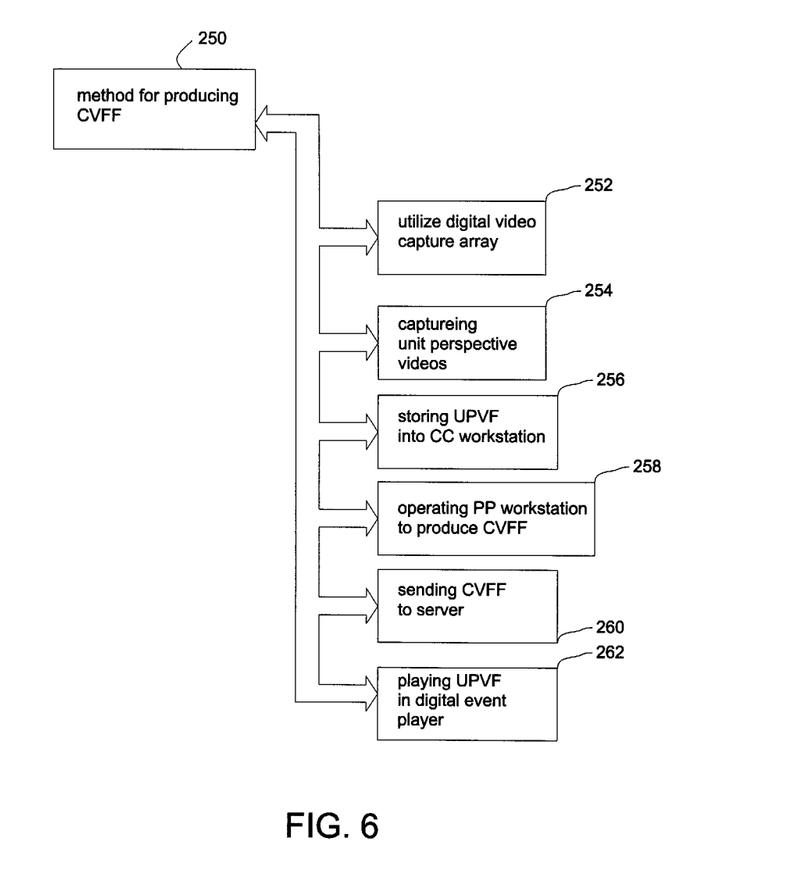
FIG. 6 is a schematic flow chart of the method for producing a composited video feed file.

As indicated above, the Digital video capture array which has a number of direct to drive video capture cameras 34a-34n FIG. 2, is utilized at step 252 FIG. 6, to capture the event 32. Once the digital video capture array is in place and is connected to the capture control workstations, the control boards, and the postproduction workstation, the event is ready to be captured.

At step 254, the production captures a number of unit perspective video files from the direct to drive video capture cameras which make up the digital video capture array.

At step 256, each of the unit perspective video files are stored in a capture control workstation 42 FIG. 2, for later editing and compositing. As the unit perspective video files are captured and stored, they are displayed on a plurality of video monitor systems 52a-52h.

In addition, the control boards 44a and 44b are utilized during the event to pan, tilt, swivel and zoom each of the direct to drive video capture cameras as the event plays out. In addition, a mapped event component which can be the focus control panel 48 as in FIG. 2, can be plugged into the control board enabling operation of the digital video capture array to direct the video capture cameras onto a focal point presentation location.

After the event is over and the unit perspective video files have been saved, they can be composited together at step 258 operating a postproduction workstation. The workstation can utilize various postproduction applications including final cut Pro, Adobe After Effects etc. The postproduction workstation is used to composite together each of the unit perspective video files into the composited video feed file.

Once the final composite video feed file is ready, it can be sent from the postproduction workstation at step 260 over to a server. The server may be a virtual server or a cloud server, where the information resides on multiple servers over the Internet. The server enables the composited video feed file to the distributed to one or more client computers, televisions, or other audio video devices such as handheld devices, for display on the client.

With the composited video feed file loaded onto the server, and available for download, the clients at step 262 can play each of the unit perspective video files simultaneously through the composite video feed file, and through a selection mechanism, choose an individual unit perspective video to display in the digital event player 100 FIG. 4, which is executed on the client.

Figure 7:
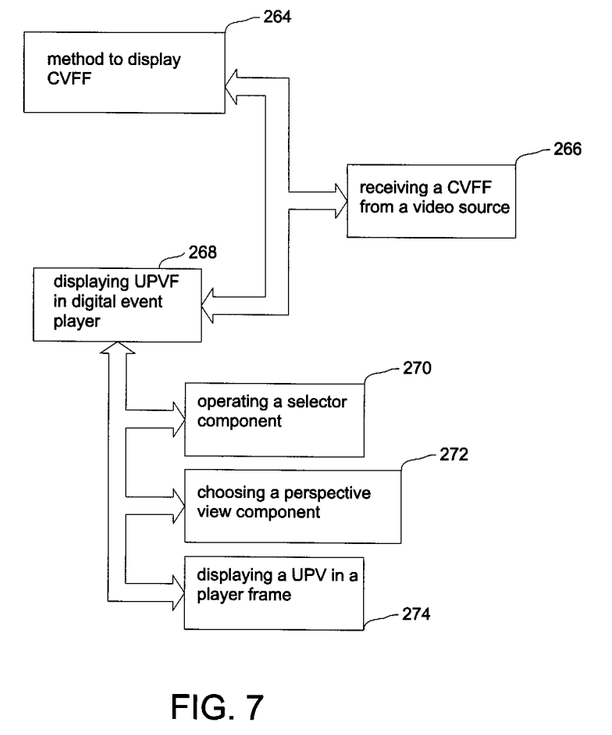
FIG. 7 is a schematic flow chart of the method to display a composited video feed file.

A method for displaying the composite video feed file 264 will now be discussed as seen in FIG. 7. Reference will also be made to FIGS. 4 and 5 as well as FIG. 2.

The event server 20 will have enabled the digital video feed file for distribution over the Internet or a network into a client 22 as in FIG. 3. The client will receive at step 266, a composite video feed file from the video source which is the event server. As discussed above, the composite video feed file will have a number of unit perspective video files. Each of the video files 200 as seen in FIG. 5, will have a unit frame height, 204, and a unit frame width 206, with a coordinate location for coordination with the digital event player.

After the digital video feed file has been received by the client, it can be displayed at step 268 in the digital event player which is executed on the client computer. There are number of different options on the digital event player which enable varied display of the composited video feed file. These include, operating a selector component 270 which enables the player to move from one view perspective to another. This is done by choosing a perspective view component 272 by aligning the selector 116 FIG. 4, with the view perspective component 114. This enables the unit perspective video to be displayed at step 274 in the frame component or player frame 84 as seen in FIG. 4.

The user can actuate or choose the loop control component 120 as seen in FIG. 4 to continuously play the currently selected unit perspective video. User can also choose a next view component 102 to scroll to the next adjacent or a second unit perspective video. The user can also choose a previous view component 104 to scroll to a previous or third unit perspective video which is adjacent to the first.

The player 100 also has a time bar 122 which enables the user to scroll backwards in time from the real-time play, and then start the plane by using the play component 106 which also acts as the pause component during the play. If the entire digital video feed file is downloaded to the client in lieu of streamed to the client, then the user can obviously start the play from the very beginning of the event.

Other objects include a forward/reverse component 118 which enables the player to operably move fast forward or rewind the unit perspective video selected for skipping ahead or reviewing the event. There may be audio with the event, so an audio controller or volume control component 111 can be used to increase or decrease the audio volume level of the unit perspective video.

We claim:

1. A method to display a composited video feed file, said method comprising:

receiving a composited video feed file from a file source that is formed by recording video of a target from a plurality of video cameras, said composited video feed file comprising a plurality of unit perspective video files each comprising a coordinate location, a unit frame height, a unit frame width, each said unit perspective video file storing a recording of a different perspective of the target; and displaying said composited video feed file in a digital event player executed on a client computer, said digital event player displaying said composited video feed file by:

operating a selector component within said digital event player;

selecting a perspective view component by aligning said selector component with said perspective view component correlated to one of said plurality of unit perspective video files;

displaying in a player frame component, a unit perspective video correlated to said perspective view component.

2. The method according to claim 1, wherein said method further comprises:

selecting a loop control component on said digital event player to continuously play said unit perspective video.

3. The method according to claim 1, wherein said method further comprises:
   selecting a next view component on said digital event player to scroll to a second unit perspective video.

4. The method according to claim 1, wherein said method further comprises:
   selecting a previous view component on said digital event player to scroll to a third unit perspective video.

5. The method according to claim 1, wherein said method further comprises:
   selecting a play component on said digital event player to begin playing said unit perspective video.

6. The method according to claim 1, wherein said method further comprises:
   selecting a component on said additional event player to operably fast forward or rewind said unit perspective video.

7. The method according to claim 1, wherein said method further comprises:
   selecting a volume control component on said digital event player to operably increase or decrease and audio volume level of said unit perspective video.

\* \* \* \* \*